Aug. 8, 1967    HIROMITSU NAKA    3,334,456
ANTI-SLIP STAIR TREAD WITH FLEXIBLE INSERTS
Filed Aug. 13, 1964    3 Sheets-Sheet 1

INVENTOR.
HIROMITSU NAKA.
BY
ATTORNEY.

Aug. 8, 1967    HIROMITSU NAKA    3,334,456
ANTI-SLIP STAIR TREAD WITH FLEXIBLE INSERTS
Filed Aug. 13, 1964    3 Sheets-Sheet 2

INVENTOR.
HIROMITSU NAKA.
BY Otto John Munz.
ATTORNEY.

Aug. 8, 1967   HIROMITSU NAKA   3,334,456
ANTI-SLIP STAIR TREAD WITH FLEXIBLE INSERTS
Filed Aug. 13, 1964   3 Sheets-Sheet 3

INVENTOR.
HIROMITSU NAKA.
BY
Otto John Munz.
ATTORNEY.

United States Patent Office 3,334,456
Patented Aug. 8, 1967

3,334,456
ANTI-SLIP STAIR TREAD WITH
FLEXIBLE INSERTS
Hiromitsu Naka, 2 Kita Sanjo Nishi, 7-chome,
Sapporo, Japan
Filed Aug. 13, 1964, Ser. No. 389,378
Claims priority, application Japan, Aug. 16, 1963,
38/59,974
1 Claim. (Cl. 52—179)

ABSTRACT OF THE DISCLOSURE

The present invention relates to an attachment for a stair tread having a metal body provided with one or more cavities defined by upstanding retention projections, and a replaceable insert member for each cavity held in position by mating engagement with the retention projections.

Background of the invention

Various types of anti-slip device have previously been proposed for stairs.

One typical prior art anti-slip device comprises a metallic body having upwardly extending projections provided with oppositely directed slanted recesses on their facing sides so as to form an echelon-shaped opening therebetween, and a metallic member inserted in the opening and having an upper surface provided with a number of longitudinally extending grooves thereon and sides slanting in parallel conformable to the slanted sides of the projections. However, in such an anti-slip device only the grooved upper surface of the inserted member can be employed for prevention of slipping, and when the upper surface has become badly worn the entire insert member has to be discarded and replaced with a new one. Another type of prior art anti-slip device for stairs flights is made of marble (both natural and artificial marble) having various cross-sectional shapes and such a marble anti-slip device has been provided with a cross-hatched, plain or fluted upper surface. In some cases the roughened or plain surface of such a marble anti-slip device has been further coated with an inorganic oxide such as Carborundum, aluminum oxide or the like. Another type of prior art anti-slip device for stairs is comprised of a metallic body such as iron (cast iron), aluminum, bronze or nickel instead of marble, and one or more insert members made of a metal such as Carborundum or aluminum oxide which are filled in its upper surface, or has comprised a metallic body having an oxide-treated surface without such metallic oxide insert members filled therein. The above-mentioned prior art anti-slip devices have usually been secured to the steps stairs by means of suitable adhesives or anchors.

The drawback associated with the above-mentioned marble-made anti-slip device is that the provision of only check grooves on the top surface of the anti-slip device fails to prevent slipping effectively because the grooved surface will easily become worn and slippery after being used a short time and this may lead to accidents. The metallic anti-slip device having its surface filled with metallic oxide insert members has the drawback that the metallic oxide insert members cannot be replaced separately, and when such insert members have become worn the entire body, including the worn insert member, has to be replaced with a new body having a new insert member. This requires a great deal of labor and is expensive.

Summary of the invention

Therefore, the object of the present invention is to provide an improved anti-slip device for stairs which can effectively eliminate the above-mentioned drawbacks associated with the prior art anti-slip devices for stairs. The present invention comprises a metallic body having one or more grooves formed in its top surface, and one or more detachable synthetic resin insert members received in the opening or openings, the insert member or members being so received in the groove or grooves that when the upper surface of the insert member has become worn the insert member may be replaced with a new one without necessity for replacing the entire body thereby assuring longer service life. In one embodiment, the insert has extensions which overlie the upper surfaces of the retention projections.

The above and other objects and advantages of the present invention will be more readily apparent from the following description when read in connection with the accompanying drawings.

Brief description of the drawing

FIGS. 10A and 10B are cross-sectional views of further modified bodies having one or more projections, arrow-shape in cross-section, on the underside thereof, respectively, in which FIG. 10B shows the projection which is provided with sawteeth-shape on one side.

Description of the preferred embodiments

For simplification of the description, explanation about the parts common to all the embodiments in the various figures will be omitted.

Figure 1:
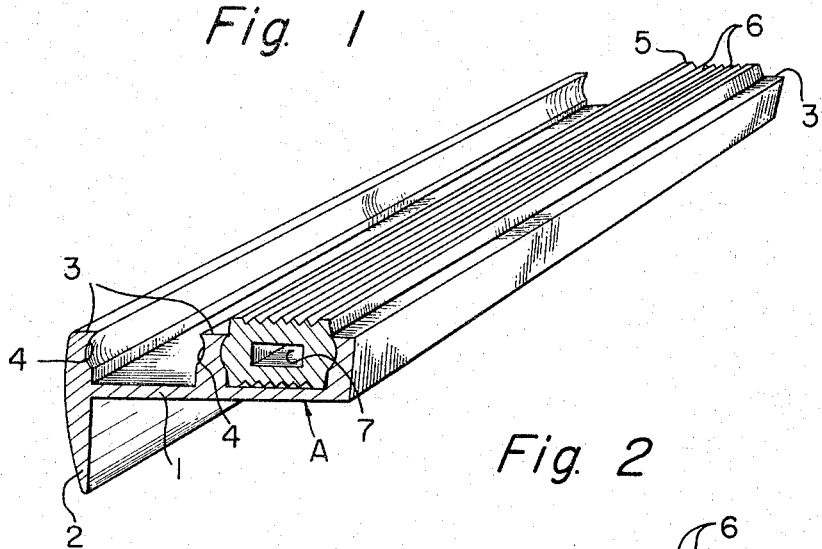
FIG. 1 is a perspective view of a preferred embodiment of the present invention.
Figure 2:
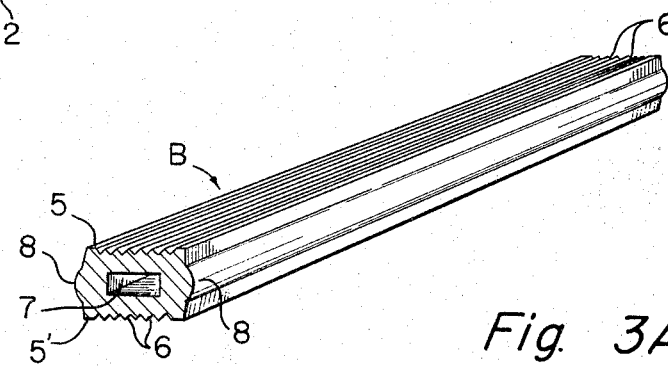
FIG. 2 is a perspective view of a synthetic resin insert member employed in said embodiment shown in FIG. 1.

Referring now to FIGS. 1 and 2 in which the most preferred embodiment of the anti-slip device of the present invention is shown is generally indicated with A and the device generally comprises a metallic body 1 having a downwardly extending anchoring flange 2 at its leading edge and a plurality of upwardly extending retention projections 3, 3' and 3" which are designated as leading projection, intermediate projection and trailing projection, respectively. The leading projection 3 is formed integral with the anchoring flange 2. The leading and trailing projections 3 and 3″ are provided with half-round recess 4 in their opposite inner surfaces and the intermediate projection 3′ is provided with half-round recesses 4 on the opposite sides thereof. The recesses 4 of the leading, intermediate and trailing walls have the same size and shape, and each two oppositely facing recesses 4 form an opening in cooperation with the upper surface of the metallic body 1 in which a flexible soft synthetic resin hollow insert member B which is made of such material as vinyl is detachably received. The insert member B has a first surface 5 and a second surface 5′ both of which are provided with a plurality of parallel longitudinal grooves 6 thereon, and a center bore 7 extending along the axis of the insert member. The number of said bores 7 can be varied to any number if desired, or said bores can be entirely neglected. The insert member B also has bulges 8 on both sides thereof and the bulges 8 are of a size and contour that just fits into the recesses 4 of the respective retention projections.

Figure 3A:
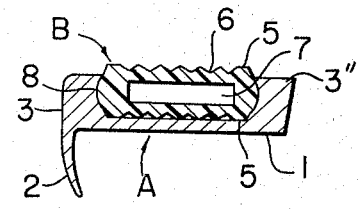
FIGS. 3A and 3B are cross-sectional views of modified embodiments of the present invention in which one or more insert members are employed, respectively.
Figure 3B:
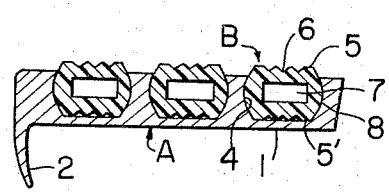

Since the novel anti-slip device of the present invention is constructed as mentioned above, when the grooved first surface 5 of the insert member B has become worn, the insert member may be inverted so as to present the second surface 5′ to the top whereby the insert member may be employed twice which assures a longer service life for the anti-slip device in which the insert member is incorporated. When either the first surface 5 or the second surface 5′ is on the top, the bulges 8 of the insert member B fit snug into the associated recesses 4 of the projections so that the insert member B may be positively held in position within the opening formed by the adjacent projections and the upper surface of the body. If the first surface 5 and the second surface 5′ of the insert member B are differently colored and the two surfaces are alternately disposed on the top, it may give a diversion of mind to those who go up and down the stairs where the novel anti-slip device is installed. In the embodiment of FIG. 1, two insert members are employed, but the number of the insert members may be varied as desired and for example, in FIG. 3A the body A is provided with only the leading and trailing projections 3 and 3″ while eliminating the intermediate projections provided in the embodiment of FIG. 1 as at 4 and accordingly, only one insert member B is employed in the embodiment of FIG. 3A. In FIG. 3B, the body is provided with three insert member receiving grooves and three insert members are individually received in the respective openings. Furthermore, the body may be provided with different sized and shaped grooves which are alternately disposed for alternately receiving different sized and shaped insert members, respectively.

There is no particular limit on the cross-sectional size and shape or on the number of center bores 7 of the insert member B, the insert member B may be provided with two or more bores 7 of any desired shape or size in cross-section.

Figure 4:
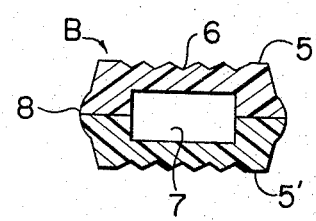
FIG. 4 is a cross-sectional view of another embodiment of insert member consisting of two symmetrical pieces, in different colors.
Figure 5A:
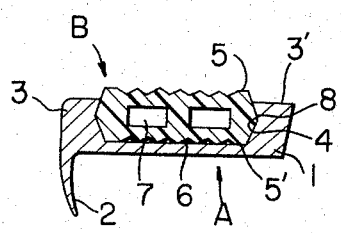
FIGS. 5A, 5B, 5C, 5D, 5E, 5F, 5G and 5H are cross-sectional views illustrating further modified bodies and insert members having peculiarly shaped retention openings and bulges, respectively.
Figure 5B:
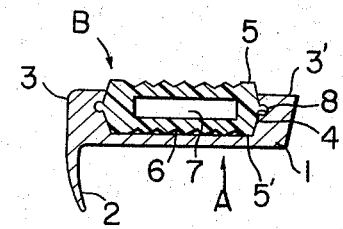
Figure 5C:
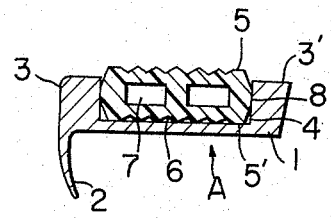
Figure 5D:
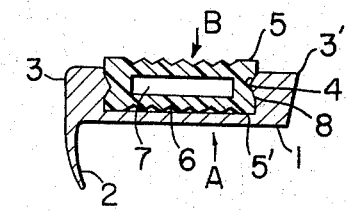
Figure 5E:
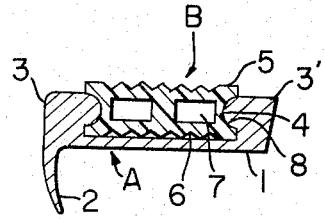
Figure 5F:
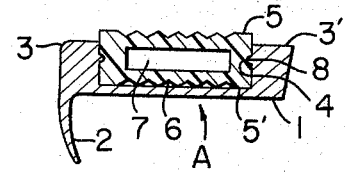
Figure 5G:
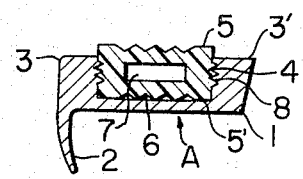
Figure 5H:
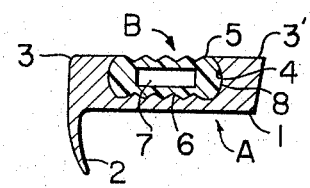

Insert member B may be also formed by two symmetrical pieces bonded together as seen in FIG. 4. The two insert member pieces bonded together may be differently colored from each other. The shape of the recess 4 (FIG. 1) in the projection of body 1 and the mating projection bulge 8 of insert member B is not limited to the half round shape as described hereinabove; the shape of recess 4 and mating bulge 8 may vary as shown in FIGS. 5A to 5H, the leading and trailing projections of the body may be formed with bulges while the insert member may be formed with mating recesses as shown in FIGS. 5D, 5E and 5F, or the facing surfaces of the retention projections and insert member may be provided with mating sawteeth as seen in FIG. 5G.

Figure 6:
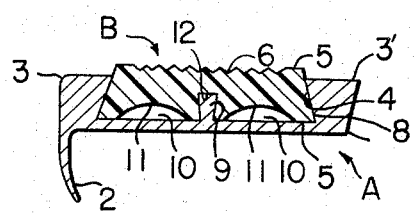
FIG. 6 is a cross-sectional view of further modified bodies having intermediate projections in addition to the leading and trailing retention projections, without intermediate retention projections, having dovetail grooves in the leading and trailing projections or inwardly extending extensions on the tops of the leading and trailing projections respectively, and insert members having recesses in their bottom surfaces, without such recesses, having lateral projections or lateral recesses on the opposite sides, respectively.

In FIG. 6, there is shown a further embodiment of the invention, in which the underside of the insert member is fixedly held by its recess 12 engaging the projection 9 provided on the surface of the body on which the insert member is to be attached. The slock recesses 11 of the insert member provide spaces 10 between the body and the insert member thereby effecting the flexibility of the insert member.

Figure 7:
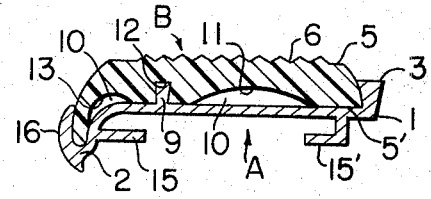
FIG. 7 is a cross-sectional view of further modified bodies having flanges provided with retaining recesses, and insert members having extensions to be inserted in the flange recesses, respectively.

In FIG. 7 a further modified body and insert member are illustrated. In FIG. 7 the body 1 has a downwardly curved anchoring flange 2 having an inwardly extending divergent extension 16 on one side and a horizontally extending stabilization piece 15 on the other side, a reversed L-shape extension 15′ on the underside of the body, and an intermediate sector projection 9 extending upwardly of the upper surface of the body 1. Insert member B has a downwardly bent leading edge which extends into the recess formed by flange 2 and its extension 16, a dovetail recess 12 which fits on the associated sector projection 9 of the body and two differently shaped and sized half-round recesses 11 and 13 on the underside of the member openings being left between said recesses 11 and 13 and the upper surface of the body.

Figure 8:
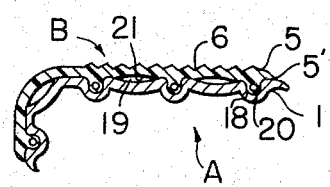
FIG. 8 is a cross-sectional view of a further modified body having a plurality of circular grooves, and an insert member having a plurality of ridges each having a hole therethrough to be inserted in the body grooves.

In FIG. 8, the body 1 has a substantially L-shaped cross-section and is alternately provided with a plurality of recesses 18 and shallow round recesses 19 on its upper surface along its width, and insert member B has also a substantially L-shaped cross-section and is provided with the corresponding number of ridge-shaped projections 20 each having a hole therethrough and half-round recesses on its underside. The ridge-shaped projections 20 are adapted to be inserted into the associated deep recesses 18 and the recesses 21 face the shallow recesses 19 leaving spaces therebetween providing flexibility of the insert member.

Figure 9:
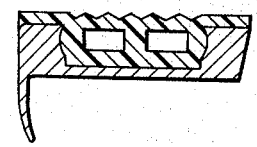
FIG. 9 is a cross-sectional view of an additional modification.

In order to protect the exposed top surface of the retention projections 3 from wear or breakage due to friction, the upper surface of insert member B may be provided with an outward extension or extensions 23 having a width just sufficient to cover the exposed top of either one or both of the retention projections as seen in FIG. 9.

Figure 10A:
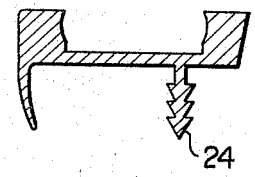
Figure 10B:
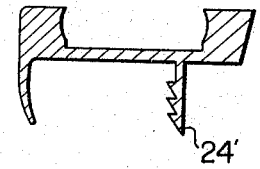

FIG. 10A illustrates a case in which the body is provided with sawteeth-like projection or projections 24 on the underside thereof which are inserted into the steps for securing the bodies to the steps. The number of said projections 24 is selected in any number desired. In FIG. 10B, there is shown an alternative embodiment of that shown in FIG. 10A. The sawteeth-like projections 24′ have the teeth only on one side thereof in order to assure that the outside surface of said body can be positively biased against the side surface of the step on which said body is to be fixed.

While various embodiments of the invention have been shown and described in detail it will be understood that these are for the purpose of illustration only and is not to be taken as a definition of the scope of the invention, reference being had for this purpose to the appended claim.

What is claimed is:

An anti-slip device for stairs which comprises an integral metallic body, an anchoring flange provided at the leading edge of said body and extending downwardly of the body, at least one flexible insert member, a plurality of spaced retention projections extending upwardly of said body detachably receiving a flexible insert member in each respective opening formed between adjacent retention projections, each of said flexible insert members having a substantial thickness and a first surface provided with surface irregularities for prevention of slipping, a second surface provided with surface irregularities, at least one bore extending axially through each of said insert members, and mating projection-recess means on opposite sides of said flexible insert member and adjacent sides of said adjacent retention projections mating and holding the flexible insert member between said adjacent retention projections, said retention projections each engaging said insert member through the entire upwardly extending surface of said projection, said insert member having horizontally outwardly extending extensions at its opposite upper edges covering the exposed tops of said retention projections.

References Cited

UNITED STATES PATENTS

| 2,288,470 | 6/1942 | Lorraine | 52—179 |
| 2,885,748 | 5/1959 | Wood | 52—179 |

FOREIGN PATENTS

| 709,700 | 1931 | France. |
| 10,971 | 1897 | Great Britain. |
| 806,664 | 1958 | Great Britain. |

JOHN E. MURTAGH, *Primary Examiner.*

RICHARD W. COOKE, JR., *Examiner.*

FRANK L. ABBOTT, *Assistant Examiner.*